United States Patent
Lin (10) Patent No.: US 11,024,264 B2
(45) Date of Patent: Jun. 1, 2021

(54) CONTROLLING FIELD OF VIEW

(71) Applicant: Beijing Xiaomi Mobile Software Co., Ltd., Beijing (CN)

(72) Inventor: Xingsheng Lin, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/167,180

(22) Filed: Oct. 22, 2018

(65) Prior Publication Data

US 2019/0122641 A1 Apr. 25, 2019

(30) Foreign Application Priority Data

Oct. 23, 2017 (CN) .......................... 201710992242.7

(51) Int. Cl.
*G09G 5/38* (2006.01)
*G06F 3/0481* (2013.01)
(Continued)

(52) U.S. Cl.
CPC .............. *G09G 5/38* (2013.01); *G06F 3/011* (2013.01); *G06F 3/0481* (2013.01); *G06F 9/451* (2018.02); *G09G 5/14* (2013.01); *G09G 5/373* (2013.01); *G02B 2027/0178* (2013.01); *G09G 2320/0613* (2013.01); *G09G 2340/045* (2013.01); *G09G 2340/14* (2013.01); *G09G 2354/00* (2013.01); *G09G 2360/18* (2013.01)

(58) Field of Classification Search
CPC ........... E04F 11/163; G02B 2027/0178; G06F 3/011; G06F 3/0481; G06F 9/451; G09G 2320/0613; G09G 2340/045; G09G 2340/14; G09G 2354/00; G09G 2360/18; G09G 5/14; G09G 5/373; G09G 5/38
See application file for complete search history.

(56) References Cited

U.S. PATENT DOCUMENTS

2014/0210949 A1* 7/2014 Berkovich ................ G06T 5/50
348/46
2016/0131908 A1 5/2016 Fateh
(Continued)

FOREIGN PATENT DOCUMENTS

CN 105320279 A 2/2016
CN 105607696 A 5/2016
(Continued)

OTHER PUBLICATIONS

Extended European Search Report dated Feb. 22, 2019 in European Patent Application No. 18201994.3, 9 pages.
(Continued)

*Primary Examiner* — Sing-Wai Wu
(74) *Attorney, Agent, or Firm* — Oblon, McClelland, Maier & Neustadt, L.L.P.

(57) ABSTRACT

The disclosure relates to a method and an apparatus for controlling a field of view of an augmented reality (AR) device. The method includes receiving, by an AR device, an instruction for starting a target application; determining, by the AR device, a preset field of view corresponding to the target application in response to receiving the instruction for starting the target application; and adjusting, by the AR device, a current field of view based on the preset field of view.

15 Claims, 11 Drawing Sheets

(51) Int. Cl.
*G06F 3/01* (2006.01)
*G06F 9/451* (2018.01)
*G09G 5/14* (2006.01)
*G09G 5/373* (2006.01)
*G02B 27/01* (2006.01)

(56) References Cited

U.S. PATENT DOCUMENTS

2016/0203646 A1 7/2016 Nadler et al.
2017/0256096 A1 9/2017 Faaborg et al.

FOREIGN PATENT DOCUMENTS

| CN | 105704478 A | 6/2016 |
| CN | 105786340 A | 7/2016 |
| EP | 3 023 872 A2 | 5/2016 |
| EP | 3 023 872 A3 | 5/2016 |

OTHER PUBLICATIONS

European Patent Office, Office Action Issued in Application No. 18201994.3, dated Jan. 29, 2021, Germany, 6 pages.

\* cited by examiner

CONTROLLING FIELD OF VIEW

CROSS-REFERENCE TO RELATED APPLICATIONS

This application is based on and claims priority to Chinese Patent Application No. 201710992242.7, filed on Oct. 23, 2017, the entire contents of which are incorporated herein by reference.

TECHNICAL FIELD

The present disclosure relates to the field of computer technology, and more particularly to controlling field of view.

BACKGROUND

In an Augmented Reality (AR) device, a field of view (FOV) is fixed, that is, a display area of a virtual picture in a display screen is fixed.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method of controlling a field of view. The method includes receiving, by an augmented reality (AR) device, an instruction for starting a target application; determining, by the AR device, a preset field of view corresponding to the target application in response to receiving the instruction for starting the target application; and adjusting, by the AR device, a current field of view based on the preset field of view.

According to an aspect, when determining the preset field of view corresponding to the target application, the method further includes determining, by the AR device, a preset display area of a preset virtual picture corresponding to the target application in a display screen; and determining, by the AR device, the preset field of view based on the preset display area.

According to another aspect, when adjusting the current field of view based on the preset field of view, the method further includes adjusting, by the AR device, a current display area based on the preset display area corresponding to the preset field of view, wherein the current display area is a display area of a current virtual picture in the display screen; and determining, by the AR device, the current field of view based on the adjusted current display area.

According to yet another aspect, the method further includes setting, by the AR device, a non-display area in the display screen as a transparent area, wherein the current virtual picture is not displayed in the non-display area.

According to yet another aspect, when determining the preset field of view corresponding to the target application, the method further includes determining, by the AR device, a type of the target application; and querying, by the AR device, the preset field of view corresponding to the type of the target application from pre-stored correspondence data that indicates correspondence between application types and preset fields of view.

Aspects of the disclosure also provide an apparatus for controlling a field of view. The apparatus includes a processor and a memory configured to store instructions executable by the processor. The processor is configured to receive, by an augmented reality (AR) device, an instruction for starting a target application; determine a preset field of view corresponding to the target application in response to receiving the instruction for starting the target application; and adjust a current field of view based on the preset field of view.

Aspects of the disclosure also provide a non-transitory computer-readable storage medium having stored thereon instructions that, when executed by one or more processors of an AR device, cause the AR device to receive an instruction for starting a target application; determine a preset field of view corresponding to the target application in response to the instruction for starting the target application; and adjust a current field of view based on the preset field of view.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of the specification, illustrate aspects consistent with the present disclosure, and together with the description, serve to explain the principles of the present disclosure.

4B is a schematic diagram showing a display area and a non-display area in a display screen according to another exemplary embodiment.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of illustrative aspects do not represent all implementations consistent with the disclosure. Instead, they are merely examples of apparatuses and methods consistent with aspects related to the disclosure as recited in the appended claims.

Figure 1A:
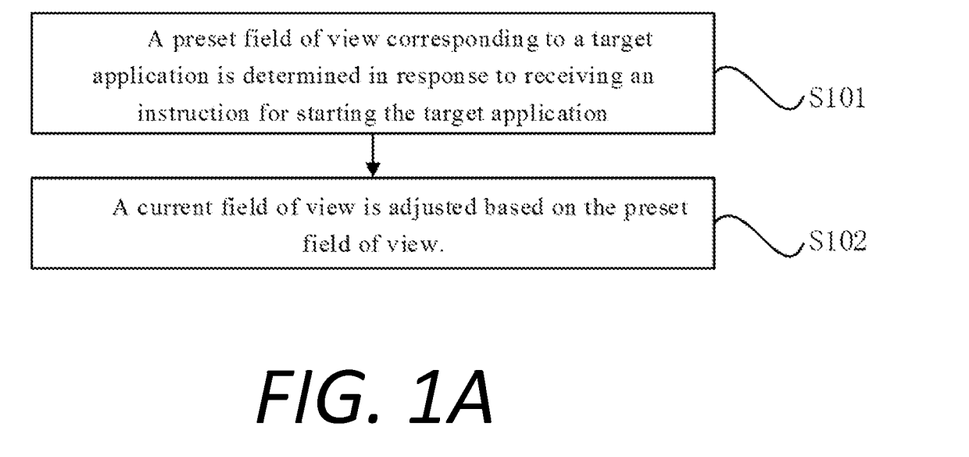
FIG. 1A is a flowchart of a method of controlling field of view according to an exemplary aspect of the present disclosure.

FIG. 1A is a flowchart of a method of controlling a field of view according to an exemplary aspect; the aspect may be used for an AR device, including AR glasses, an AR helmet, etc. As shown in FIG. 1A, the method includes the following Steps S101-S102:

S101: a preset field of view corresponding to a target application is determined in response to receiving an instruction for starting the target application.

In an aspect, the instruction described above may include an instruction generated by a user via touching a predetermined location on the AR device or pressing a button on the AR device, or a voice command from the user to open the target application.

In an aspect, the target application may be a pre-installed application in the mobile device, including but not limited to, instant messaging application such as WeChat, text reading application, video playing application, and various game applications. The mobile device is a device associated with the AR device, such as the user's mobile phone, PC, or other terminal with a display screen, etc.

Figure 1B:
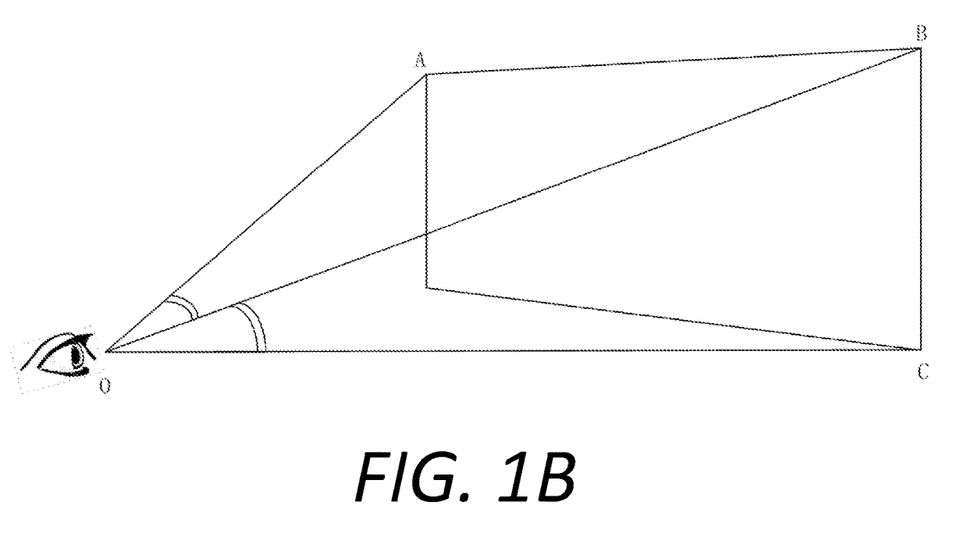
FIG. 1B is a schematic diagram showing a field of view according to an exemplary aspect of the present disclosure.

In this aspect, the FOV indicates an angular range of the virtual scene viewable to human eyes through the AR device. In an AR device, the field of view generally refers to the horizontal field of view. In particular, FIG. 1B is a schematic diagram of field of views according to an exemplary aspect. As shown in FIG. 1B, ∠AOB is the horizontal field of view and ∠BOC is the vertical field of view. When the field of view is greater than 110°, people usually turn his/her head instead of looking sideways to view pictures at the edge of the field of view, which leads to fatigue, therefore, the FOV is usually set to less than 110°.

Figure 2:
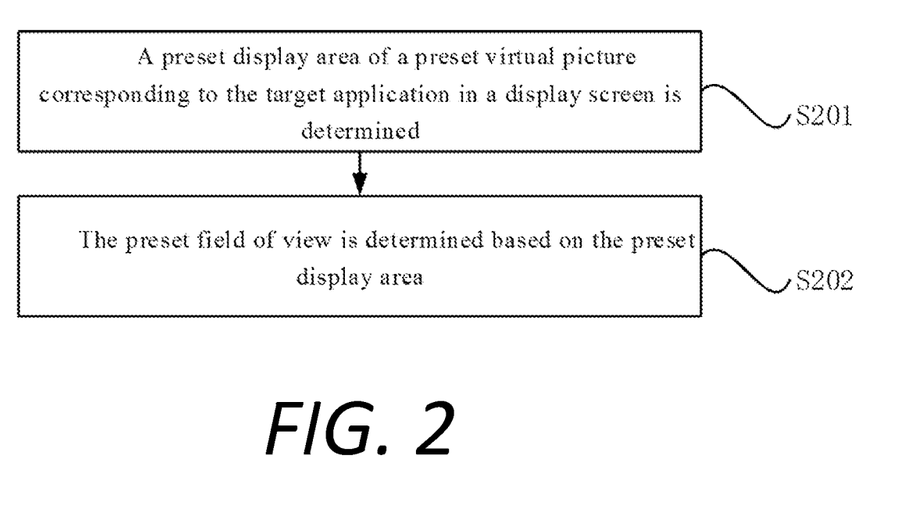
FIG. 2 is a flowchart illustrating determining a preset field of view corresponding to a target application according to an exemplary aspect of the present disclosure.
Figure 5:
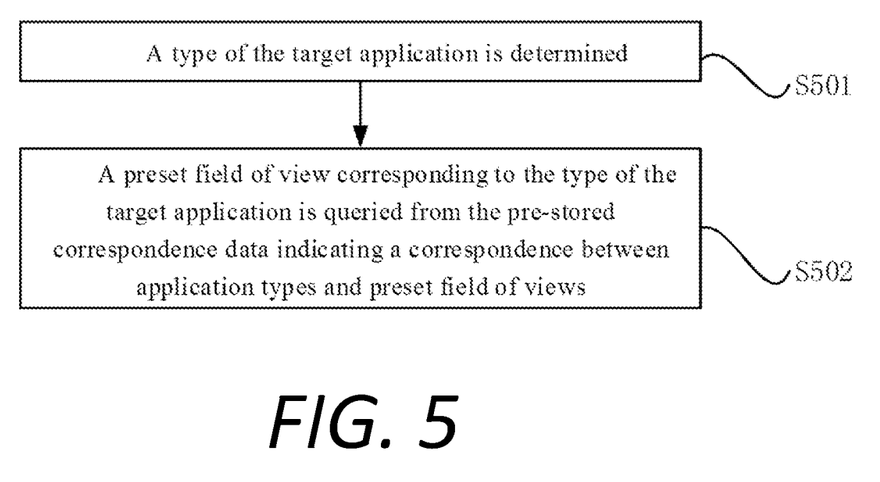
FIG. 5 is a flowchart illustrating determining a preset field of view corresponding to a target application according to another exemplary aspect of the present disclosure.

In an aspect, the process of determining the preset field of view corresponding to the target application may refer to the following aspects shown in FIG. 2 and FIG. 5, and details are not described here.

S102: a current field of view is adjusted based on the preset field of view.

In an aspect, the current field of view indicates an angular range in which the AR device currently displays the virtual scene.

In an aspect, after determining the preset field of view corresponding to the target application to be opened, the current field of view of the AR device may be adjusted based on the preset field of view.

In an aspect, for a text reading application, a video playing application, various game applications and the like, a large preset display area may be set to enhance the visual effect and improve user experience; while for instant messaging application such as WeChat, weather forecast application, step counting application, time displaying application, navigation application and other auxiliary applications, a small preset display area may be set to avoid blocking the sight of the user when walking or driving.

It can be seen from the above description that in the aspect of the present disclosure, the preset field of view corresponding to the target application is determined in response to receiving the instruction for starting the target application and the current field of view is adjusted based on the preset field of view. In this way, different field of views may be set according to different target applications, thereby meeting the requirements of different applications for field of views and improving the intelligence level of the terminal device.

FIG. 2 is a flowchart illustrating determining a preset field of view corresponding to a target application according to an exemplary aspect. As shown in FIG. 2, determining the preset field of view corresponding to the target application in step S101 may include steps S201-S202:

S201: a preset display area of a preset virtual picture corresponding to the target application in a display screen is determined.

In an aspect, a corresponding display area may be preset for different applications, where setting of the display area may include the size of the display area.

In an aspect, an identifier of the target application may be determined first, and then the preset display area corresponding to the identifier of the target application is queried from the pre-stored correspondence of application identifiers and preset display areas.

S202: the preset field of view is determined based on the preset display area.

In an aspect, the preset field of view may be determined according to the size of the preset display area.

In an aspect, the preset field of view is proportional to the size of preset display area.

In an aspect, the scaling factor between the preset display area and the preset field of view may be determined according to the type or model of the AR device.

According to the above technical solution, by determining the preset display area of the preset virtual picture corresponding to the target application in the display screen, and determining the preset field of view based on the preset display area, the preset field of view may be determined reasonably and accurately. The accuracy of adjusting the current field of view based on the preset field of view may be further improved.

Figure 3:
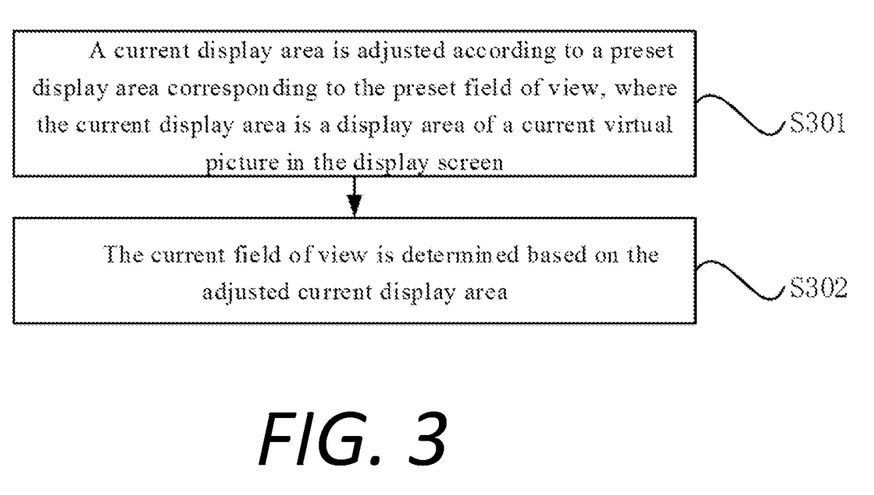
FIG. 3 is a flowchart illustrating adjusting a current field of view based on the preset field of view according to an exemplary aspect of the present disclosure.

FIG. 3 is a flowchart illustrating adjusting a current field of view based on the preset field of view according to an exemplary aspect. As shown in FIG. 3, the current field of view is adjusted based on the preset field of view according to step S102, which may include steps S301-S302.

S301: a current display area is adjusted according to the preset display area corresponding to the preset field of view, where the current display area is a display area of a current virtual picture in the display screen;

In an aspect, the size of the display area of the current virtual picture in the display screen may be adjusted according to the size of the preset display area corresponding to the preset field of view. For example, the size of the current display area may be set to be the same as the size of the preset display area.

S302: the current field of view is determined based on the adjusted current display area.

In an aspect, after determining the size of the adjusted current display area, the current field of view may be determined according to the size of the adjusted current display area.

In an aspect, the current field of view is proportional to the size of the adjusted current display area.

In an aspect, the scaling factor between the adjusted current display area and the current field of view may be determined based on the type or model of the AR device.

According to the foregoing technical solution, the display area of the current virtual picture in the display screen is adjusted according to the preset display area corresponding to the preset field of view, and the current field of view is determined based on the adjusted current display area, so that different field of views may be set according to different target applications, thereby meeting the requirements of different applications for field of views and improving the intelligence level of the terminal device.

Figure 4A:
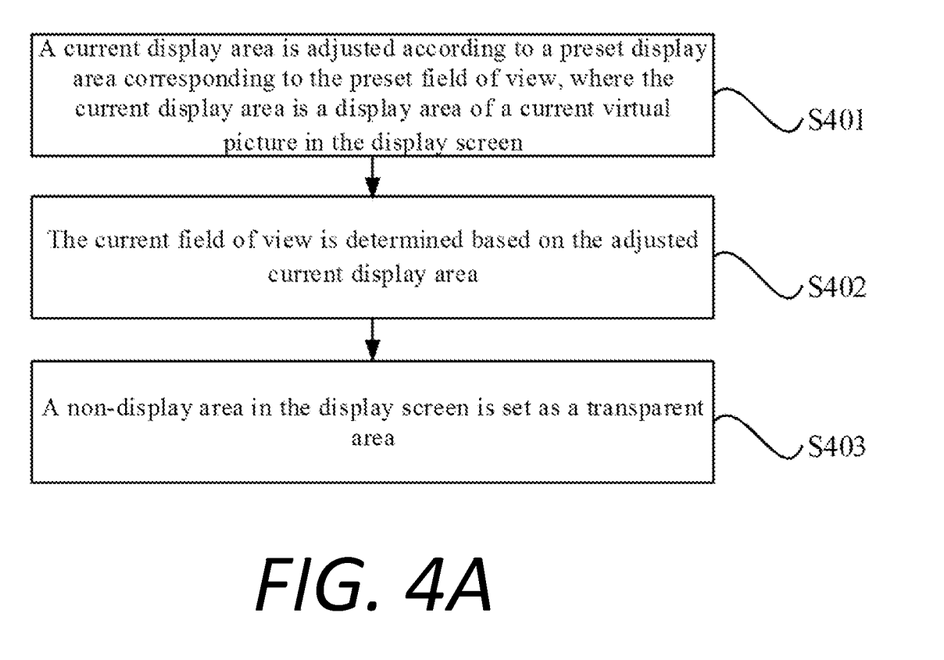
FIG. 4A is a flowchart illustrating adjusting a current field of view based on the preset field of view according to another exemplary aspect of the present disclosure.
Figure 4B:
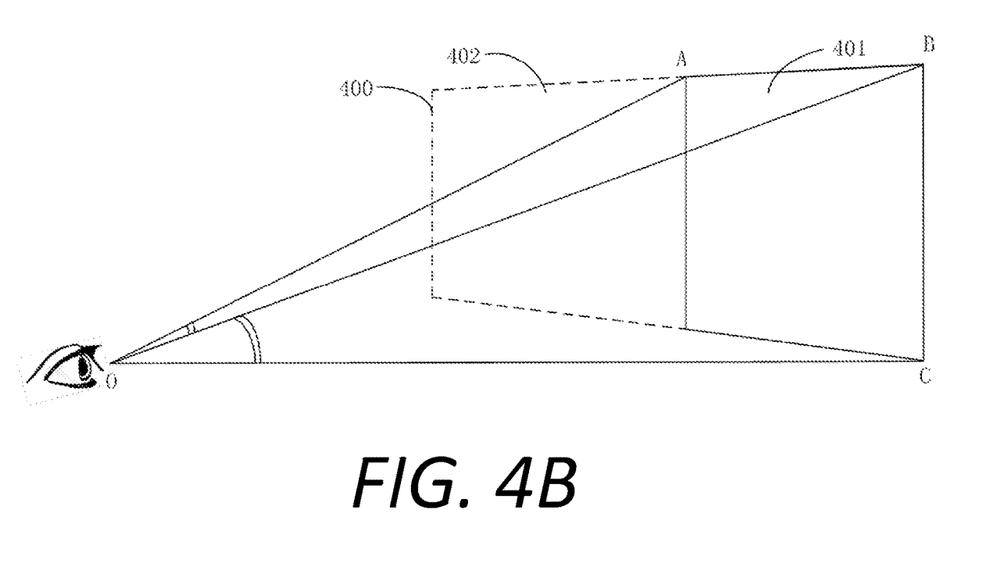

FIG. 4A is a flowchart illustrating adjusting a current field of view based on the preset field of view according to another exemplary aspect; FIG. 4B is a display area and a non-display area in a display screen according to an exemplary aspect. As shown in FIG. 4A, the current field of view is adjusted based on the preset field of view according to step S102, which may include steps S401-S403.

S401: a current display area is adjusted according to the preset display area corresponding to the preset field of view, where the current display area is a display area of a current virtual picture in the display screen;

S402: the current field of view is determined based on the adjusted current display area.

S403: a non-display area in the display screen is set as a transparent area; where the non-display area is an area in the display screen where the current virtual picture is not displayed.

The steps S401-S402 are the same as the steps S301-S302 in the foregoing aspect of the present disclosure. For related explanations, reference may be made to the foregoing aspects, and details are not described here.

As shown in FIG. 4B, in an aspect, the process of adjusting the current field of view ∠AOB based on the preset field of view may include setting the non-display area 402 (i.e., an area other than the current display area 401 in the display screen 400) as a transparent area, in addition to adjusting the current display area 401 according to the preset display area. For example, the user may observe the road condition or the like through the transparent non-display area 402 while walking or driving.

According to the foregoing technical solution, the display area of the current virtual picture in the display screen is adjusted according to the preset display area corresponding to the preset field of view, the current field of view is determined based on the adjusted current display area, and the non-display area is set to be transparent. On the one hand, different field of views may be set according to different target applications, thereby satisfying the requirements of different applications for field of views, on the other hand, security of the user using the AR device in an application scenario such as walking or driving may be improved.

FIG. 5 is a flowchart illustrating determining a preset field of view corresponding to a target application according to another exemplary aspect. As shown in FIG. 5, determining the preset field of view corresponding to the target application in the foregoing step S101 may include the following steps S501-S502:

S501: a type of the target application is determined;

In an aspect, in response to receiving the instruction for starting the target application, the type of the target application is determined. The types of the target applications include, but are not limited to, instant messaging, text reading, video playing, weather forecast, navigation, game, etc.

S502: a preset field of view corresponding to the type of the target application is queried from a pre-stored correspondence data indicating the correspondence between application types and preset field of views.

In an aspect, the AR device pre-stores the correspondence data indicating the first correspondence between application types and preset field of views.

In an aspect, the first correspondence data pre-stored in the AR device is as shown in Table 1 below:

TABLE 1

| Correspondence between application types and preset field of views | | | | | | |
|---|---|---|---|---|---|---|
| | Program type | | | | | |
| | Instant messaging | Text reading | Navigation | Weather forecast | Video playing | Game |
| Preset field of view | 45° | 45° | 45° | 45° | 90° | 90° |

In an aspect, after the AR device determines the type of the target application (for example, the text reading type), the Table 1 may be queried to determine a preset field of view corresponding to the type of the target application (i.e., 45°).

In an aspect, the preset field of view corresponding to the current application scenario may be queried from pre-stored second correspondence data according to the current application scenario; where the second correspondence data indicates the correspondence between the current application scenarios and the preset field of views.

For example, in an application scenario such as driving or walking that requires more attention to the external environment, the preset field of view may be set small (for example, 45°) to avoid blocking the sight of the user. In an application scenario of taking the subway, staying indoors, etc., without the need of paying much attention to the external environment, the field of view may be set as large as possible (for example, 90°).

In an aspect, the type of the application and the preset field of view corresponding to the current application scenario may be freely set by the user according to actual conditions.

According to the foregoing technical solution, the flexible setting of the field of view according to the application type and/or the application scenario may be realized by querying the appropriate preset field of view according to the pre-stored correspondence data, thereby improving the intelligence level of the terminal and enhancing user experience.

Figure 6:
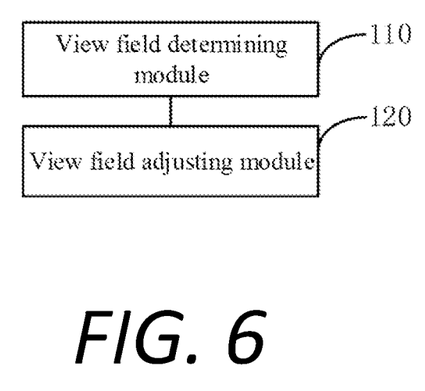
FIG. 6 is a block diagram of an apparatus for controlling a field of view according to an exemplary aspect of the present disclosure.

FIG. 6 is a block diagram of an apparatus for controlling a field of view according to an exemplary aspect. As shown in FIG. 6, the apparatus includes a view field determining module 110 and a view field adjusting module 120.

The view field determining module 110 is configured to determine a preset field of view corresponding to a target application in response to receiving an instruction for starting the target application.

The view field adjusting module 120 is configured to adjust a current field of view based on the preset field of view.

It can be seen from the above description that in response to receiving the instruction for starting the target application, the preset field of view corresponding to the target application is determined, and the current field of view is adjusted based on the preset field of view. In this way, different field of views are set according to different target applications, thereby meeting the requirements of different applications for different field of views, and improving the intelligence level of the terminal device.

Figure 7:
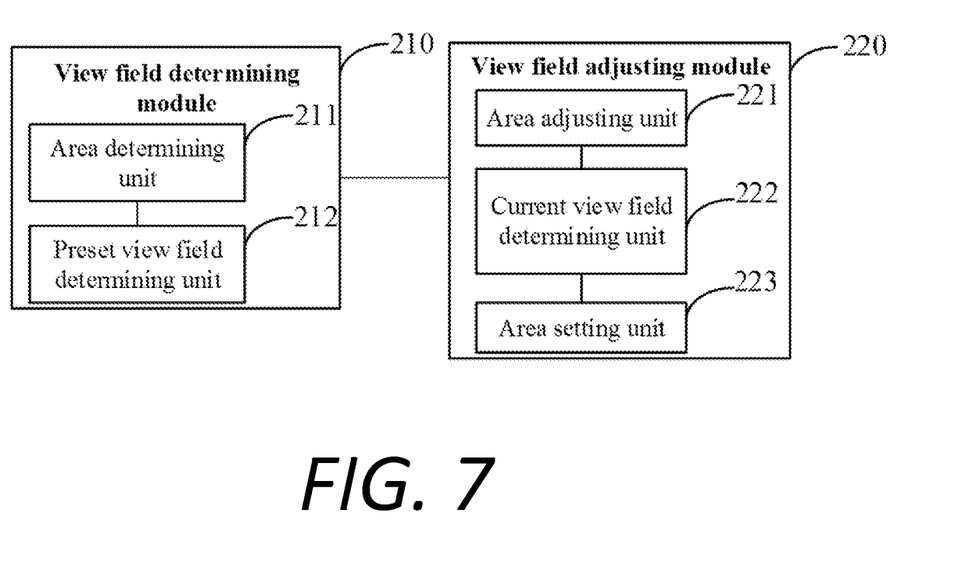
FIG. 7 is a block diagram of an apparatus for controlling a field of view according to another exemplary aspect of the present disclosure.

FIG. 7 is a block diagram of an apparatus for controlling a field of view according to still another exemplary aspect; where the view field determining module 210 and the view field adjusting module 220 are the same as the view field determining module 110 and the view field adjusting module 120 in aspect shown in FIG. 6, and are not described repeatedly herein. As shown in FIG. 7, on the basis of the foregoing aspect, the view field determining module 210 may further include:

area determining unit 211 configured to determine a preset display area of the preset virtual picture corresponding to the target application in a display screen;

preset view field determining unit 212 configured to determine the preset field of view based on the preset display area.

In an aspect, the view field adjusting module 220 may include:

area adjusting unit 221 configured to adjust a current display area according to the preset display area corresponding to the preset field of view, where the current display area is a display area of a current virtual picture in the display screen;

current view field determining unit 222 is configured to determine the current field of view based on the adjusted current display area.

In an aspect, the view field adjusting module 220 may further include an area setting unit 223 which is configured to set a non-display area in the display screen as a transparent area. The non-display area is an area in the display screen where the current virtual picture is not displayed.

Figure 8:
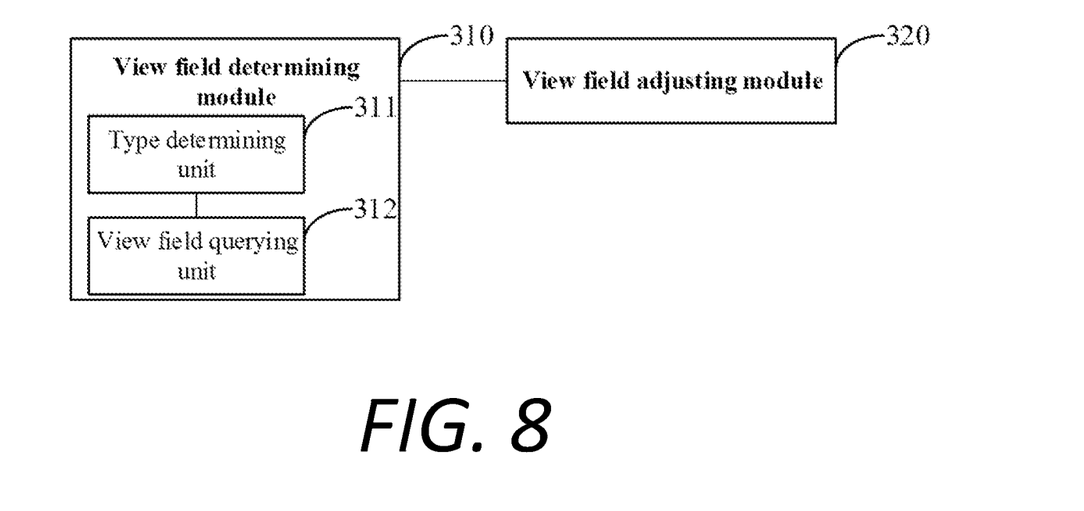
FIG. 8 is a block diagram of an apparatus for controlling a field of view according to still another exemplary aspect of the present disclosure.

FIG. 8 is a block diagram of an apparatus for controlling a field of view according to still another exemplary aspect; where the view field determining module 310 and the view field adjusting module 320 are the same as the view field determining module 110 and the view field adjusting module 120, and are not repeatedly described here. As shown in FIG. 8, on the basis of the aspect shown in FIG. 6, the view field determining module 310 may further include:

type determining unit 311 configured to determine a type of the target application;

view field querying unit 312 configured to query, from pre-stored correspondence data, a preset field of view corresponding to the type of the target application, where the correspondence data indicates the correspondence between the application types and the preset field of views.

According to the foregoing technical solution, the preset field of view corresponding to the type of the target application may be queried from the pre-stored correspondence data based on the type of the target application, so that the field of view may be set according to the application type, improving the intelligence level of the terminal and enhancing user experience.

Figure 9:
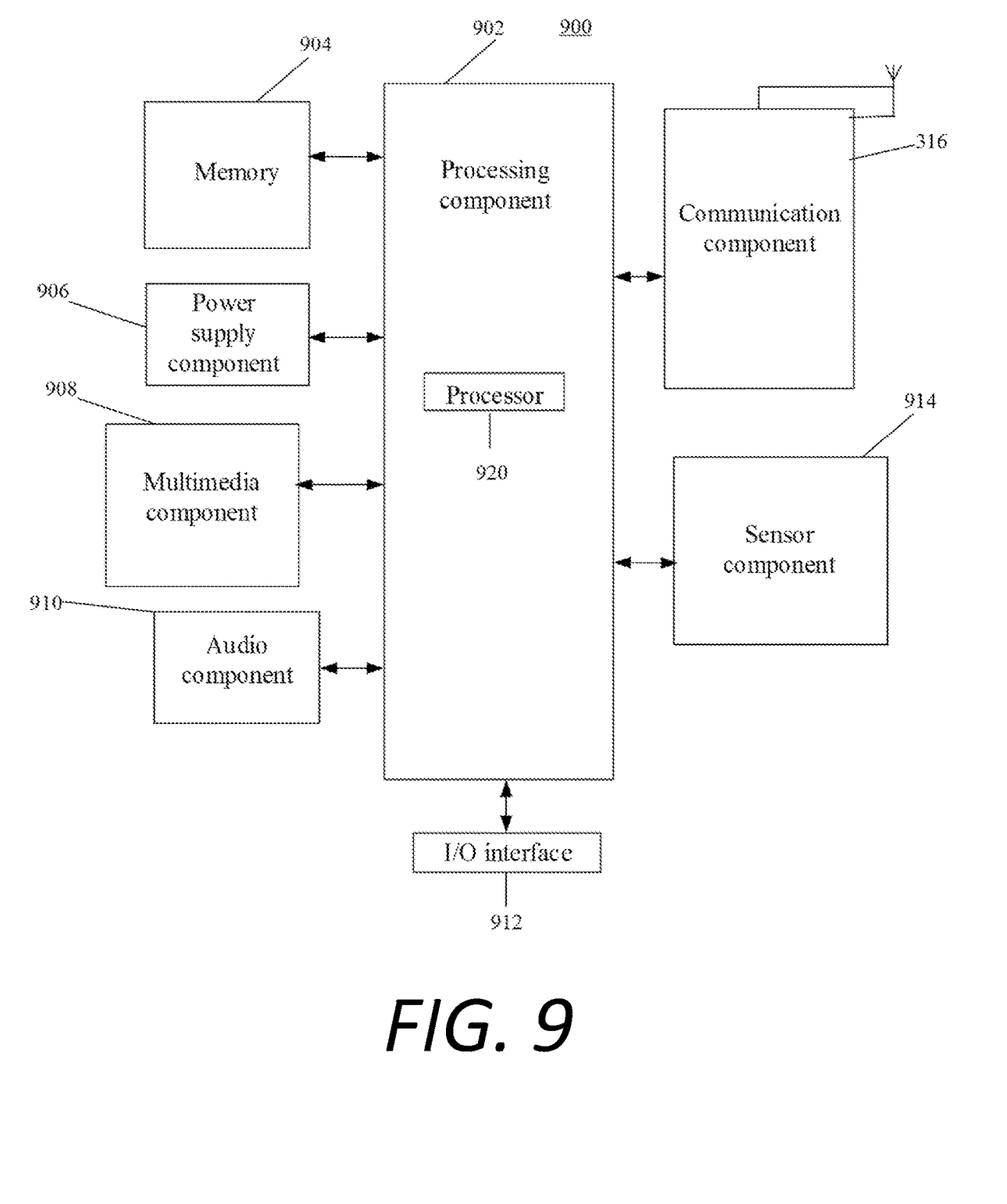
FIG. 9 is a block diagram of an electronic device according to an exemplary aspect of the present disclosure.

FIG. 9 is a block diagram of an electronic device according to an exemplary aspect. For example, device 900 may be a mobile phone, a computer, a digital broadcast terminal, a message transceiving device, a game console, a tablet device, a medical device, a fitness device, a personal digital assistant, and the like.

Referring to FIG. 9, a device 900 may include one or more of the following components: processing component 902, memory 904, power supply component 906, multimedia component 908, audio component 910, input/output (I/O) interface 912, sensor component 914, and communication component 916.

Processing component 902 typically controls the overall operation of the device 900, such as operations associated with display, telephone calls, data communications, camera operations, and recording operations. Processing component 902 can include one or more processors 920 to execute instructions to perform all or part of the blocks of the above methods. Moreover, processing component 902 may include one or more modules to facilitate interaction between component 902 and other components. For example, processing component 902 may include a multimedia module to facilitate interaction between multimedia component 908 and processing component 902.

Memory 904 is configured to store various types of data to support operation of device 900. Examples of such data include instructions for any application or method operating on device 900, contact data, phone book data, messages, pictures, videos, and the like. The memory 904 may be implemented by any type of volatile or non-volatile storage device, or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, or optical disk.

Power supply component 906 provides power to various components of device 900. The power supply component 906 may include a power management system, one or more power sources, and other components associated with generating, managing, and distributing power for device 900.

The multimedia component 908 includes a screen that provides an output interface between the device 900 and the user. In some aspects, the screen may include a Liquid Crystal Display (LCD) and a Touch Panel (TP). If the screen includes a touch panel, the screen may be implemented as a touch screen to receive input signals from a user. The touch panel includes one or more touch sensors to sense touches, slides, and gestures on the touch panel. The touch sensor may not only sense the boundary of the touch or slide operation, but also detect the duration and pressure associated with the touch or slide operation. In some aspects, the multimedia component 908 includes a front camera and/or a rear camera. When the device 900 is in an operating mode, such as a shooting mode or a video mode, the front camera and/or the rear camera may receive external multimedia data. Each of the front and rear cameras may be a fixed optical lens system or have focal length and optical zoom capabilities.

The audio component 910 is configured to output and/or input an audio signal. For example, the audio component 910 includes a microphone (MIC) that is configured to receive an external audio signal when the device 900 is in an operating mode, such as a call mode, a recording mode, and a voice recognition mode. The received audio signal may be further stored in memory 904 or transmitted via communication component 916. In some aspects, the audio component 910 also includes a speaker for outputting an audio signal.

The I/O interface 912 provides an interface between the processing component 902 and a peripheral interface module, which may be a keyboard, a click wheel, a button, or the like. These buttons may include, but are not limited to, a home button, a volume button, a start button, and a lock button.

Sensor component 914 includes one or more sensors for evaluating state of various aspects of device 900. For example, sensor component 914 may detect on/off state of the device 900, relative locations of components, such as the display and keypad of device 900, and sensor component 914 may also detect a change in position of device 900 or one component of device 900, the presence or absence of user contact with device 900, orientation or acceleration/deceleration of the device 900, and temperature variation of device 900. The sensor component 914 may include a proximity sensor configured to detect the presence of nearby objects without any physical contact. The sensor component 914 may also include an optical sensor, such as a CMOS or CCD image sensor, for use in imaging applications. In some aspects, the sensor component 914 may also include an acceleration sensor, a gyroscope sensor, a magnetic sensor, a pressure sensor, or a temperature sensor.

Communication component 916 is configured to facilitate wired or wireless communication between device 900 and other devices. The device 900 may access a wireless network based on a communication standard, such as WiFi, 2G or 3G, or a combination thereof. In an exemplary aspect, the communication component 916 receives a broadcast signal or broadcast-associated information from an external broadcast management system via a broadcast channel. In an exemplary aspect, the communication component 916 also includes a Near Field Communication (NFC) module to facilitate short range communication. For example, the NFC module may be implemented based on Radio Frequency Identification (RFID) technology, Infrared Data Association (IrDA) technology, Ultra Wide Band (UWB) technology, Bluetooth (BT) technology, and other technologies.

In an exemplary aspect, the device 900 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGA), controller, microcontrollers, microprocessors or other electronic component to perform the above described method of controlling a field of view.

In an exemplary aspect, there is also provided a non-transitory computer-readable storage medium comprising instructions, such as a memory 904 comprising instructions executable by processor 920 of the device 900 to perform the above-described method of controlling a field of view. For example, the non-transitory computer-readable storage medium may be a ROM, a Random Access Memory (RAM), a CD-ROM, a magnetic tape, a floppy disk, and an optical data storage device.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as illustrative only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method of controlling a field of view, comprising:
    receiving, by an augmented reality (AR) device, an instruction for starting a target application;
    determining, by the AR device, a preset field of view of the AR device according to the target application in response to receiving the instruction for starting the target application, the preset field of view of the AR device being pre-stored in the AR device in association with the target application; and
    adjusting, by the AR device, a current display area in a display screen of the AR device based on and consistent with the preset field of view of the AR device,
    wherein
    the determining the preset field of view of the AR device according to the target application comprises:
        determining, by the AR device, a type of the target application; and
        querying, by the AR device, the preset field of view of the AR device corresponding to the type of the target application from pre-stored correspondence data that indicates correspondence between application types and corresponding field of views, and
    the pre-stored correspondence data comprises:
        an instant messaging type application associated with a first field of view of the AR device; and
        a video playing type application associated with a second field of view of the AR device that is greater than the first field of view of the AR device.

2. The method according to claim 1, wherein determining the preset field of view of the AR device according to the target application comprises:
    determining, by the AR device, a preset display area of a preset virtual picture in the display screen of the AR device corresponding to the target application; and
    determining, by the AR device, the preset field of view of the AR device based on the preset display area.

3. The method of claim 2, wherein adjusting the current display area in the display screen of the AR device based on and consistent with the preset field of view of the AR device comprises:
    adjusting, by the AR device, the current display area based on the preset display area corresponding to the target application; and
    determining, by the AR device, a current field of view based on the adjusted current display area.

4. The method of claim 3, further comprising:
    setting, by the AR device, a non-display area in the display screen that is different from the current display area as a transparent area, through which an external environment is observable.

5. The method of claim 1, wherein
    the first field of view of the AR device is 45°, and
    the second field of view of the AR device is 90°.

6. An apparatus for controlling a field of view, comprising:
    a processor; and
    a memory configured to store instructions executable by the processor,
    wherein
    the processor is configured to:
        receive an instruction for starting a target application;
        determine a preset field of view of the AR device according to the target application in response to receiving the instruction for starting the target application, the preset field of view of the AR device being pre-stored in the AR device in association with the target application; and adjust a current display area in a display screen of the apparatus based on and consistent with the preset field of view of the AR device, wherein when determining the preset field of view of the AR device according to the target application, the processor is further configured to:

determine a type of the target application; and query the preset field of view of the AR device corresponding to the type of the target application from pre-stored correspondence data that indicates correspondence between application types and corresponding field of views, and the pre-stored correspondence data comprises:

an instant messaging type application associated with a first field of view of the AR device; and a video playing type application associated with a second field of view of the AR device that is greater than the first field of view of the AR device.

7. The apparatus according to claim 6, wherein, when determining the preset field of view of the AR device according to the target application, the processor is further configured to:

determine a preset display area of a preset virtual picture in the display screen of the AR device corresponding to the target application; and determine the preset field of view of the AR device based on the preset display area.

8. The apparatus according to claim 7, wherein, when adjusting the current display area in the display screen of the AR device based on and consistent with the preset field of view of the AR device, the processor is further configured to:

adjust the current display area based on the preset display area corresponding to the target application; and determine a current field of view field based on the adjusted current display area.

9. The apparatus according to claim 8, wherein the processor is further configured to:

set a non-display area in the display screen that is different from the current display area as a transparent area, through which an external environment is observable.

10. The apparatus according to claim 6, wherein the first field of view of the AR device is 45°, and the second field of view of the AR device is 90°.

11. A non-transitory computer-readable storage medium having stored thereon instructions that, when executed by one or more processors of an augmented reality (AR) device, cause the AR device to:

receive an instruction for starting a target application;

determine a preset field of view of the AR device according to the target application in response to the instruction for starting the target application, the preset field of view of the AR device being pre-stored in the AR device in association with the target application; and adjust a current display area in a display screen of the AR device based on and consistent with the preset field of view of the AR device, wherein when determining the preset field of view of the AR device according to the target application, the instructions further cause the AR device to:

determine a type of the target application; and query the preset field of view of the AR device corresponding to the type of the target application from pre-stored correspondence data that indicates correspondence between application types and corresponding field of views, and the pre-stored correspondence data comprises:

an instant messaging type application associated with a first field of view of the AR device; and a video playing type application associated with a second field of view of the AR device that is greater than the first field of view of the AR device.

12. The non-transitory computer-readable storage medium of claim 11, wherein, when determining the preset field of view of the AR device according to the target application, the instructions further cause the AR device to:

determine a preset display area of a preset virtual picture in the display screen of the AR device corresponding to the target application; and determine the preset field of view of the AR device based on the preset display area.

13. The non-transitory computer-readable storage medium of claim 12, wherein, when adjusting the current display area in the display screen of the AR device based on and consistent with the preset field of view of the AR device, the instructions further cause the AR device to:

adjust the current display area based on the preset display area corresponding to the target application; and determine a current field of view field based on the adjusted current display area.

14. The non-transitory computer-readable storage medium of claim 13, wherein the instructions further cause the AR device to:

set a non-display area in the display screen that is different from the current display area as a transparent area, through which an external environment is observable.

15. The non-transitory computer-readable storage medium of claim 11, wherein the first field of view of the AR device is 45°, and the second field of view of the AR device is 90°.

* * * * *